Sept. 1, 1953   E. E. TEUBNER   2,650,979
METHOD AND APPARATUS FOR ELECTRICALLY
DISINTEGRATING METALLIC MATERIAL
Filed June 21, 1950                                     2 Sheets-Sheet 1
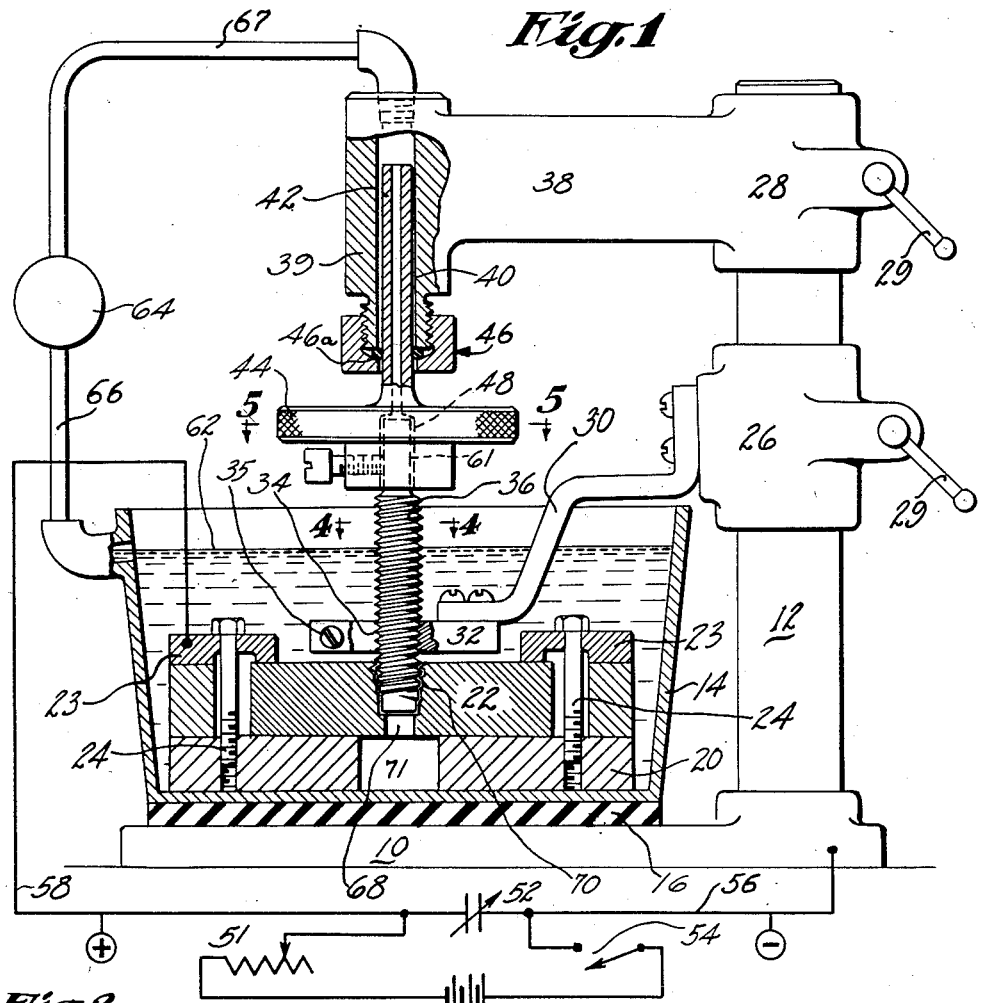
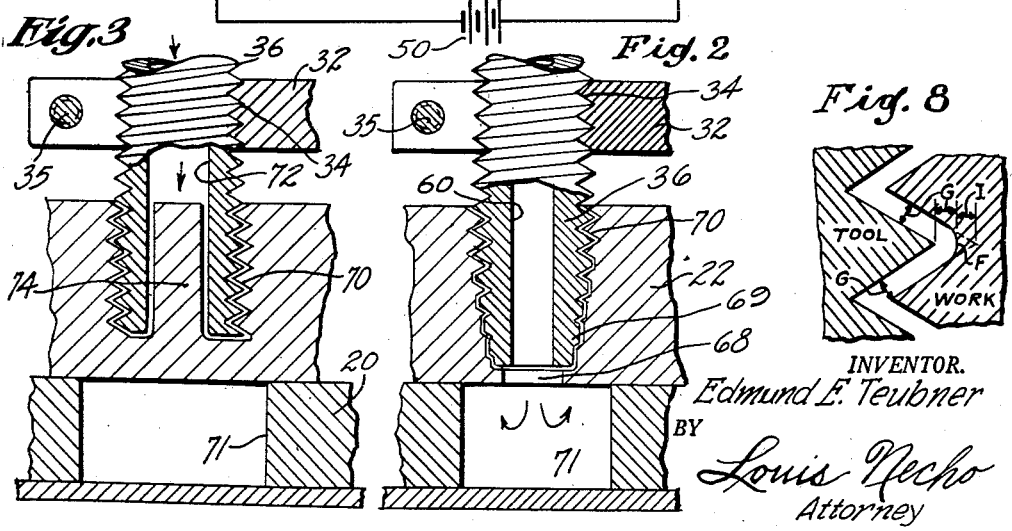
INVENTOR.
Edmund E. Teubner
BY
Louis Necho
Attorney Sept. 1, 1953  E. E. TEUBNER  2,650,979
METHOD AND APPARATUS FOR ELECTRICALLY
DISINTEGRATING METALLIC MATERIAL
Filed June 21, 1950  2 Sheets-Sheet 2
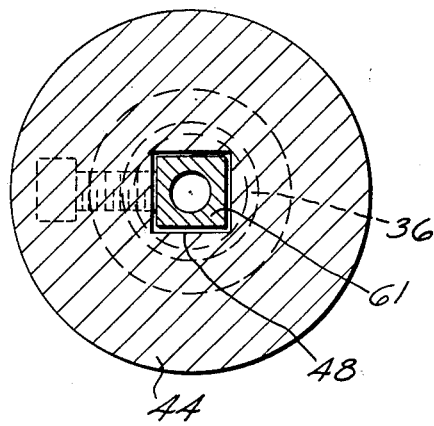
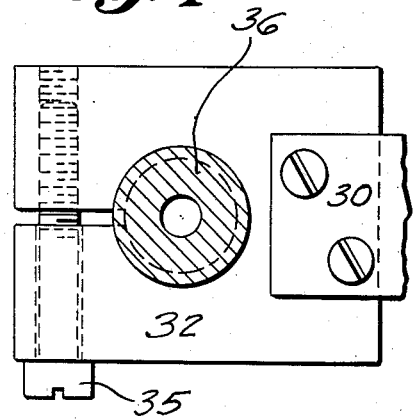
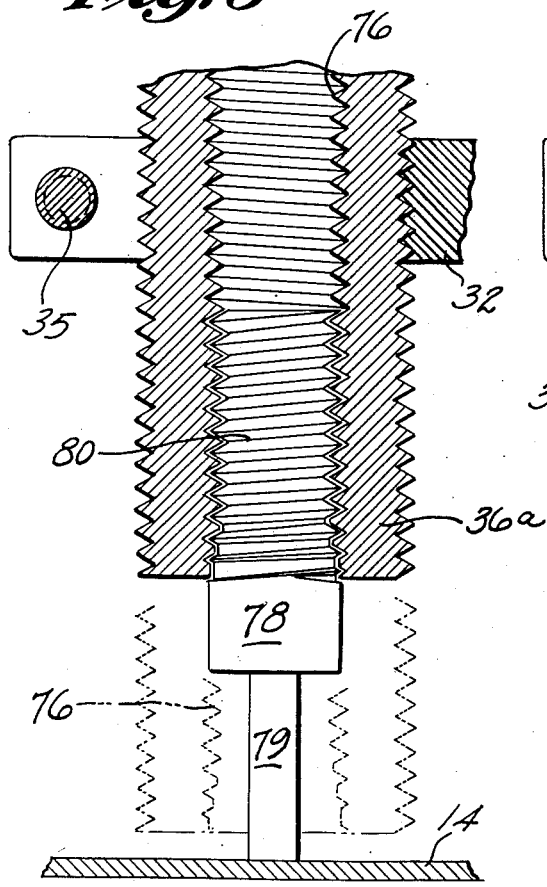
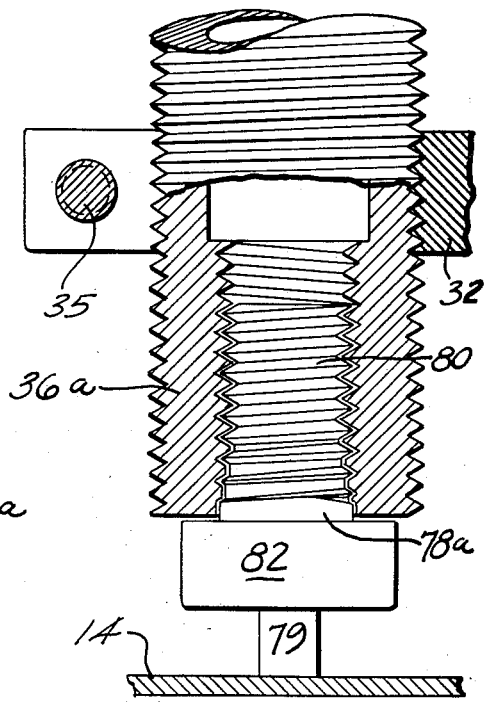
INVENTOR.
Edmund E. Teubner
BY
Louis Necho
Attorney Patented Sept. 1, 1953

2,650,979

UNITED STATES PATENT OFFICE 2,650,979

METHOD AND APPARATUS FOR ELECTRICALLY DISINTEGRATING METALLIC MATERIAL

Edmund E. Teubner, Philadelphia, Pa., assignor to Method-X Company, Lansdale, Pa., a corporation of Pennsylvania Application June 21, 1950, Serial No. 169,438

19 Claims. (Cl. 219—15)

The present invention relates in general to the art of electrically dislodging particles of hard conductive materials such as tungsten carbide, boron carbide, hard steel alloys, and the like, and is concerned more particularly with the production of contours of revolution and translation in such materials.

When a very hard metal or metallic material is used as a tip for a tool, as a die, or as a wear resisting facing, etc., the part made of hard metal is secured to a backing made from a relatively soft metal. This can be done by brazing, by clamping, or by bolting the part to its backing and, in certain instances, this practice is satisfactory. But, there are many cases where, due to the large size, or due to the delicacy of the parts, it is not desirable, or it is not possible, to resort to brazing. In other cases an uninterrupted surface is required and clamping or bolting of the parts together is not permissible.

In instances such as those just mentioned, it would be highly advantageous to attach the hard part to its backing by means of screws engaging tapped holes formed in the hard metallic part or workpiece. However, due to the extreme hardness of the metallic parts referred to, it has heretofore been impossible to produce holes having internal screw threads or other special internal contours.

Likewise, in the production of naval and land guns, it has heretofore been the practice to use a relatively hard metal in making the gun itself and then to insert a lining, made of a relatively soft metal so that it could be rifled, in the barrel of the gun. Consequently, after a certain number of firings, a gun made in this fashion must be relined. The military and economic advantages to be derived from providing such guns with rifled linings formed of one of the extremely hard alloys, metals or metallic materials, will, therefore, be obvious to those skilled in the art.

It is therefore the general aim of the invention to provide a novel apparatus for, and a novel method of, machining contours of revolution and translation in relatively hard conductive materials by electrical dislodgment of the particles therefrom.

A more specific object of the invention is to provide an apparatus and method of the character set forth for producing screw threads, rifling or other helical or spiral contours in the internal surfaces of holes, recesses, gun barrels and the like, as well as external surfaces of revolution and translation as later set forth herein and illustrated in the drawings.

In the accompanying drawings

Fig. 1 is a view, partly in elevation and partly in section, diagrammatically illustrating the novel method and one form of apparatus for carrying out said method.

Fig. 2 is an enlarged, fragmentary sectional view showing details of construction and one application of the invention.

Fig. 3 is similar to Fig. 2 but showing another application of the invention.

Figs. 4 and 5 are enlarged sectional views taken along lines 4—4 and 5—5 of Fig. 1.

Figs. 6 and 7 are enlarged, fragmentary views, partly in section and partly in elevation, illustrating the manner in which external threads may be produced.

Fig. 8 is an enlarged fragmentary sectional view through the workpiece and tool of Fig. 1 and showing diagrammatically the relation between the generated and generating contours therein.

While the present invention is susceptible of various modifications and alternative constructions, certain illustrative embodiments of the apparatus and method have been illustrated in the drawings and will be described below in considerable detail. It should be understood, however, that there is no intention to limit the invention to specific forms disclosed, but on the contrary, the intention is to cover all modifications and alternative constructions falling within the spirit and scope of the invention as expressed in the appended claims.

Referring more specifically to the drawings, the illustrative apparatus shown therein includes a supporting base or pedestal 10 which carries or is provided with an upstanding column 12. On the base 10 is supported a container 14 adapted to hold a supply of dielectric fluid, the container being electrically insulated from the base by means of a pad 16 formed of rubber or other insulating material. In the bottom of the container 14 is a metallic, electrically conductive block 20 for supporting a workpiece 22 to be acted on. The workpiece is fastened to the supporting block 20 by means of clamps 23 and bolts 24 both of which are good conductors of electricity whereby an electric current reaching a clamp 23 will also reach the workpiece 22 and supporting block 20. The column 12 slidably carries a lower collar 26 and an upper collar 28, each of said collars being made fast to the column by a conventional clamp arrangement operated by lever 29. By this means, each of the said collars 26 and 28 may be fixed to said column at any desired height from the base.

The lower collar 26 is provided with or carries a radially and downwardly extending arm 30 to the lower end of which is detachably secured a split guide nut 32 having a central threaded opening 34 formed therein. The ends of the split guide nut are engaged by a screw 35 whereby the nut may be clamped or tightened about an externally threaded tool 36 passing through the internally threaded opening 34. The upper collar 28 is provided with, or carries, an arm 38 which carries, or terminates in, a head 39 having a through vertical opening 40 formed therein for receiving a tube 42 which is carried by an actuating knob or hand wheel 44. In order to provide a liquid tight joint while permitting hollow tube 42 to slide freely in opening 40, a conventional packing gland 46, including packing 46a, is detachably secured to the bottom of head 39 and through which tube 42 freely moves. The handwheel 44 is provided with tool chucking means including a polygonal recess 48 which communicates with the interior of tube 42.

Electrical energy is supplied from a direct current source 50 by means of a circuit which includes a variable resistance 51, a variable condenser 52 or a bank of individually controlled condensers, and a control switch 54. The negative side of the circuit is connected, by wire 57, and through column 12, arm 30 and guide nut 32 to the tool 36, which constitutes a cathodic electrode, and the positive side of the circuit is connected by means of wire 58 and through clamp 23 to work piece 22 which constitutes an anodic electrode. The tool 36 has a thread-like contour of a form appropriate to the contour to be generated in the workpiece. In this instance, the tool 36 has an axial opening 60 therethrough and at its upper end is provided with a polygonal shank 61 adapted to engage a polygonal recess 48 in handwheel 44, being retained therein by the use of a suitable set screw. By this arrangement, a liquid admitted into tube 42 will also flow through shank 61 and through tool 36.

The container 14 is filled with a suitable dielectric fluid 62 to a point sufficient to immerse the active portion of the tool 36 and that portion of the workpiece 22 being cut by the tool. A fluid pump 64 is provided for drawing fluid from the container 14 through a flexible pipe 66 of nonconducting material and delivering the fluid through a flexible pipe 67, also of nonconducting material, to the top of tube 42 as diagrammatically illustrated in Fig. 1.

In operation, the workpiece 22 is clamped onto block 20 and collar 26 is adjusted on the column 12 so that the guide nut 32 lies close to the upper surface of the workpiece. The collar 28 is now loosened and arm 38, head 39 and wheel 44 are raised enough to permit insertion of the shank 61 of the tool 36 into recess 48 in handwheel 44. The collar 28 is next lowered on the column 12 until the lower end of tool 36 passes through hole 34 in nut 32 but without touching the workpiece 22. The collar 28 is now tightened about column 12 and screw 35 is turned to tighten nut 32 about tool 36. With the parts in the position described, the switch 54 is closed and the pump 64 is set in motion. By turning the wheel 44 in a direction to lower the tool, the lower end of the tool will be brought close enough to the workpiece to cause the condenser to discharge in the form of a spark which passes through the dielectric fluid between the lower end of the tool and the workpiece. Immediately upon discharge, the condenser begins to recharge, and as soon as it is fully charged to the potential required electrically to break down the dielectric it discharges again, such cycle being repetitive. By adjusting variable resistance 51 the rate of charge of the condenser can be controlled. Each discharge causes a small particle of the material of the tool, which may be of brass or other conveniently machinable, conductive material, and a larger particle of the material of the workpiece, to be dislodged at the point of impact of the spark. The material thus dislodged is floated or washed away by the dielectric fluid which may be pumped through the bore of the tool into the hole being cut, or cut and tapped, as shown by the arrows in Figs. 2 and 3. As the workpiece and the tool disintegrate, the wheel 44 (or any equivalent feed mechanism) is actuated to lower the tool and keep the gap between the tool and the workpiece substantially constant. As the disintegration of the workpiece begins, the end of the tool adjacent the workpiece first forms a recess in the surface of the workpiece. But because with each advancement of the tool with reference to the workpiece, the tool is subjected to an increment of rotary movement about its axis, the dislodgment of the material of the workpiece will take the form of a thread which is approximately complementary to the thread on the tool as clearly shown in the drawings. This is due to the fact that the sparks jump successively from those points on the area of the thread of the tool which then, in combination with the workpiece, define the minimum length portion of the spark gap.

Referring to Fig. 8, which is an enlarged fragmentary sectional view through the workpiece and the tool taken axially of the latter, it will be noted that the thread on the tool is spaced from the thread on the workpiece by the length of the spark gap, designated by the letter G. This spacing applies to all points on both threads except for those points situated near the root of the tool thread and across from the crest of the workpiece thread. Since the spark discharges across the gap G occur normal to adjacent surfaces of the tool and the workpiece, the spark discharges across the gap will take place at points on the tool thread other than those in the immediate vicinity of its root where the gap distance exceeds the value G. By the same token, the spark discharge from the crest of the tool thread will tend to describe at the root of the workpiece thread an arcuate fillet F having a radius equal to the gap distance G and struck from the crest of the thread on the tool as a center. The fillet F will be formed in the workpiece instead of a sharp V-root because, in order to cut a sharp V-root, the spark discharge would have to travel a distance of G plus I, thereby exceeding the spark gap length G, as shown in Fig. 8.

As indicated earlier herein, the contour of the workpiece operated upon by the tool will be formed in a pattern approximately but not exactly complementary to the tool thread. It will be appreciated upon consideration of Fig. 8 that for relatively large values of the gap G, such, for example, as might be used in roughing cuts, the fillet F will be relatively large and hence the thread of the workpiece will quite obviously be only the approximate complement of the thread on the tool. On the other hand, as the value of the gap G is decreased so as to approach zero, such for example as might occur in a light finishing cut, the radius of the fillet F will also approach zero and the resulting thread in the workpiece will, for all practical purposes, be complementary to the thread on the tool. However, it should be borne in mind that mechanical and electrical factors require that the value of the gap G always have some minimum finite measurable value, such, for instance, as .0005 inch.

Obviously, by varying the pitch of the thread or helical contour on the tool, the pitch of the thread or helical contour produced in the workpiece is varied accordingly and anything, from a machine screw thread to a rifled gun barrel, can be produced.

When threading a hole 68 which already exists in workpiece 22, as shown in Fig. 2, it will be found that the bottom of the tool and the adjacent portion of the hole being threaded will have approximately complementary tapers, as at 69 and, in order to complete the threading of the hole 68, it is necessary that the tool pass through the workpiece until a full-diameter wholly uneroded portion of the tool clears the bottom edge of the hole 68.

In order to permit the tool to be passed to the desired extent through the workpiece, the block 20 is made sufficiently think (or it is raised above the bottom of the container) and is provided with a hole or recess 71.

It will be understood that as a portion of the hole has been threaded, as at 70, the gap or clearance between the coacting surfaces of the tool and the hole will be eroded to such a distance as to prevent further sparking therebetween. Therefore, to complete the threading of the hole, the tool must be passed through the tapped hole until sparking between the tool and the workpiece ceases, at which time the spark gap between the tool and the work will be of equal length throughout. This is due to the fact that unless sparking is sooner terminated, as by the opening of control switch 54, sparking will continue to take place at the point of minimum gap and particles will continue to be dislodged from the workpiece until all points of the workpiece in coactive relation to the tool are spaced therefrom by the distance G, being the greatest distance through which the potential of the electrodes is effective to break down the dielectric.

It is to be understood that the application of spark transmitted energy at any time will be concentrated upon the then existing spark gap of minimum length. This will thereby become determinative of the voltage to which condenser 52 will be charged before the potential across this minimum gap will occasion a spark discharge. It is also to be understood that if the feed control wheel 44 is continuously adjusted so as to maintain a spark gap of constant length at or adjacent to the portion of the tool most actively productive of cutting discharges, the gap between the tool and the outermost tapped portions of the hole will be not greater than this constant gap length. By this means it is possible to controllably limit the length of the spark gap to a value less than that determined by the maximum length of the spark which can be passed through the given dielectric by the given potential available from the source 50.

The phenomenon just described may therefore be utilized to control the dimensional relations between the threaded hole formed in the workpiece and the portion of the tool which effects distribution of the spark discharges by determining the changing location of the point within the spark gap which defines the path of minimum length. To this end, the resistance 51 limits the rate of transmission of energy from source 50 to a rate substantially lower than the minimum rate of discharge of energy at the spark gap. Thus from the instant a spark discharge is initiated, there will be a continuous fall of the potential across the spark gap until this reaches a value too low to maintain the gap in an ionized and conductive condition, whereupon the condenser 52 will begin to accumulate its next succeeding charge accompanied by a concomitant rise in the voltage existing across its terminals. This insures that the spark gap, while still ionized, will dissipate energy faster than it can be supplied through resistance 51 and thereby prevents arcing across the spark gap. Such action results in a succession of separate spark discharges, each time-spaced from the next by an interval which is adequate to allow that portion of the dielectric which was last electrically broken down by a spark passage to de-ionize in preparation for a later spark passage at the point which next becomes the point of minimum gap length.

The application of the invention described thus far is satisfactory in cases where the tapped hole extends wholly through the workpiece. In fact, if the workpiece can be formed by casting, molding, sintering, or otherwise, with a hole of the desired diameter so that it is merely necessary to tap or thread such hole, the threading operation will be greatly expedited because the amount of material to be removed from the workpiece is correspondingly reduced.

In cases where a short screw is to be used, the tapping operation can be stopped before the hole goes completely through the workpiece because the short screw referred to will engage the upper, fully formed threads and it frequently becomes immaterial whether the lower portions of the threads are perfectly formed to the bottom extremity of a so-called blind hole (see Fig. 3). If this condition is desired, the eroded end may be cut from a used tool and the new and uneroded end may be reinserted or a new uneroded tool may be employed to perfect the innermost threads in the workpiece.

When it is desired to simultaneously cut and tap a hole, as shown in Fig. 3, the tool will cut a cylindrical hole 72 corresponding to the bore in the tool, thus leaving a cylindrical core 74 which is broken off after the cutting and threading operation is completed. In this case, because the tool is cutting and threading, that is, because there is no pre-existing hole 68, radial wear on the actively cutting portions of the tool will be more nearly uniform and neither the lower end of the tool nor the lower portion of the hole will be as drastically tapered as shown in Fig. 2. The tapped hole thus produced may stop at the stage shown in Fig. 3, or it may extend clear through the workpiece, as desired.

It is possible to tap the hole 68 of Fig. 2 and to cut and tap as shown in Fig. 3 with a solid tool, that is, with a tool which has no bore through it. However, if the tool has a bore through it, the dielectric fluid can be constantly circulated so as to carry away the particles resulting from the dislodgment process as shown by the arrows. In the case of simultaneous cutting and tapping, as in Fig. 3, the provision of a bore within the tool eliminates the necessity of removing the material of the core 74 by means of electrical dislodgment.

The present invention has applications other than tapping or cutting and tapping holes. For example, the lining of a naval or land gun can be made of one or another of the hard metals mentioned earlier herein and can be rifled or provided with a helical groove according to the invention. Such lining will last through many more firings than a similar lining, which, to be cut or milled by conventional mechanical means, must be made of a relatively soft metal which can be cut by available tools. In other words, by making the linings of large caliber guns of hard materials and rifling them according to the present invention, such guns can be used for much longer periods without being relined than is possible with guns of present construction.

I have actually practiced the invention disclosed by threading holes, and by simultaneously cutting and tapping holes, with hollow and with solid tools in the hard materials above set forth, both experimentally and for commercial use, and any one who duplicates the apparatus shown and follows the method of operation above set forth can produce commercially saleable and usable products.

For the present, and as a result of careful observation, I feel justified in suggesting that for best results the following conditions should be observed: (1) The tool should be connected to the negative side, and the workpiece to the positive side of the circuit. (2) The tool should preferably be made of a non-ferrous metal which is a good conductor of electricity. (3) The workpiece and adjacent end of the tool should at all times be immersed in a dielectric fluid. (4) The electric energy which does the work should be in the nature of capacitor discharge sparks which are spaced in time, as by regulating the recharge time of the capacitors as distinguished from a "continous" or interrupted arc.

In certain instances extreme accuracy or a fine finish is not required and, in such cases, the average amperage and voltage per condenser discharge should be relatively high. In other words, for rough tapping, or for rough cutting and tapping, the average amperage and voltage can be raised and the particles removed by each discharge will be bigger and will leave a rougher surface. Conversely, when it is desired to produce a fine finish, the average amperage and voltage are lowered and the particles removed by each spark will be correspondingly smaller and will leave a smoother surface. These changes in conditions will, of course, affect the dimensional relationship of the tool to the thread which will be formed in the workpiece and to the size of the screw which will neatly fit the thread formed in the workpiece.

While the tool has been shown as having a single screw thread of a given pitch, it is obvious that the tool could have a multiple screw thread and that the pitch of the thread can be chosen to suit the user, with corresponding results in the workpiece. Also, while the invention has only been illustrated as applied to the cutting of a screw thread or the like, it is obvious that other shapes can be produced in the workpiece by using appropriately shaped tools 36.

Turning now to Figs. 6 and 7, the formation of external threads by application of the present invention is there illustrated. To produce a stud, that is, a screw without an enlarged head at one end thereof, a hollow tool 36a is employed. The tool 36a is externally threaded for engagement with the split guide nut 32 in the manner above set forth, and is also internally threaded as at 76. The stock 78 on which the thread is to be cut is preferably of a diameter not less than the diameter of the root of the thread in the tool and is mounted on any suitable support 79 which takes the place of the block 20 of Fig. 1. If the stock 78 is substituted for the workpiece 22 of Fig. 1, and if the tool 36a is substituted for tool 36 of Fig. 1, and if the tool 36a is lowered or telescoped over the stock 78, the connections, the assembly and the manner of operation being the same as in Fig. 1, a portion of the stock 78 will be fed into the threaded bore of the tool 36a and a thread 80 will be cut on such portion of the stock 78. If it is desired to thread the stock 78 over its entire length, the tool 36a is lowered until its lower edge is well below the lower end of the stud, as shown in exaggerated fashion in broken lines in Fig. 6.

In Fig. 7, the stock 78a is of a larger diameter than the inside diameter of the tool 36a and therefore, if the cutting operation is arrested before the end of stock 78a is reached, a bolt or cap screw having a head 82 can be produced. If the tool 36a of Fig. 6 or Fig. 7 is substituted for the tool 36 in Fig. 3, the workpiece 22 will be threaded internally and the core 74 will be threaded externally at the same time provided, of course, that the internal and external threads are of the same pitch.

In practice, the invention disclosed herein has proven versatile in meeting that range of operating requirements expected of previously known edge tool cutting machines in which the workpiece is mechanically cut by contact with the tool. For instance, when it is desired to make the equivalent of a roughing cut in which workpiece material is removed rapidly and in large particles with relatively little regard for accuracy of finished work dimensions or excellence of surface finish, the maximum available capacity of condenser 52 is utilized; at the same time, a relatively large spark gap spacing such, for instance, as .020 inch is used, thereby permitting utilization of a relatively high charging rate without danger of arcing across the spark gap. This is accomplished by adjusting the resistance 51 to a relatively low value of impedance in the charging circuit. This combination of conditions is productive of the maximum energy release per spark discharge and when the circuit is operated at the highest possible frequency, results in the highest possible rate of workpiece particle dislodgment.

When it is desired to achieve a more precisely complementary relation between the tool and the workpiece, circuit conditions can be adjusted to a relatively smaller energy release per spark discharge. This is accomplished by reducing the capacity of condenser 52 and perhaps by impeding the charging rate through increasing the value of the resistance 51, whereby permitting reduction of the minimum gap length between tool and workpiece. This requires a lessened voltage on the electrodes to avoid danger of arcing rather than sparking therebetween. Under such conditions the length of the spark gap may be on the order of .005 inch.

To develop all the speed of metal dislodgment which is possible under either of the last mentioned conditions, it is preferable to operate with the minimum impedance to the charging rate which is suitable alike to the effective condenser capacity and the existing length of spark gap which can be used without arcing thereacross.

When it is desired to attain the maximum possible excellence of surface finish and likewise the highest possible fidelity of complementary relation between work form and tool form, a minimum of condenser capacity and a minimum length of spark gap, such for instance as .0005 inch, are utilized. Under any condition of lessened spark gap length, it is not strictly necessary to make a commensurate reduction in the charging rate because the rate of energy release is not proportionately decreased. This is because of greatly increased frequency of passage of sparks, each of which releases a greatly decreased energy per spark. Though the speed of metal removal is not then greatly reduced, the condition of rigorous complementary relation of tool and workpiece, when viewed in a plane passing through the axis of the tool, is approached more closely than when operating at greater spark gap lengths.

Upon reflection, it will be appreciated that the above-described method of, and apparatus for, electrically disintegrating metallic material, includes a plurality of controls each of which affects a plurality of the conditions pertaining to the electric circuit. It has also been shown how both the rate of metal removal and the accuracy and character of the finished workpiece surface are altered when these controls are adjusted to the required combinations of circuit conditions upon which the desired result is dependent.

What I claim is:

1. In an apparatus for forming threaded contours by electrical dislodgment of particles from a conductive workpiece, the combination comprising means for holding the workpiece, a tool having a thread-like contour, means for effecting a series of time-spaced electrical spark discharges between said tool and the workpiece through a dielectric medium interposed therebetween, and means for effecting combined relative revolution and translation between said tool and the workpiece to simultaneously make and tap a hole in the latter.

2. An apparatus for producing a screw thread or the like in a workpiece of conductive material by electrically dislodging particles of such material therefrom, said apparatus comprising, in combination, means for supporting the workpiece, an electrode having a thread-like contour and spaced from said workpiece by a dielectric-filled spark gap, energy storage means including a condenser, a circuit for charging said condenser from a source of current, an electric circuit connecting said condenser to the workpiece and to said electrode for the application of a series of time-spaced spark discharges between the latter and the workpiece across said spark gap, and means for effecting combined relative axial and rotary movement between the workpiece and said electrode to simultaneously make and tap an aperture in the workpiece, said movement effecting means being adapted to maintain said spark gap at a length conducive to discharge of sparks across said gap by said condenser, whereby a thread is formed in the workpiece with said electrode maintained in spaced relation to the workpiece.

3. An apparatus for producing a screw thread or the like in a workpiece of conductive material by electrically dislodging particles of such material therefrom, said apparatus comprising the combination of means for supporting the workpiece, a hollow electrode spaced from said workpiece by a spark gap inundated with a dielectric fluid, said electrode having a thread-like contour, electrical energy storage means, charging and discharging circuits for said energy storage means, said discharging circuit being connected to said electrode and to the workpiece for the application of a series of time-spaced spark discharges across the spark gap, means for circulating dielectric fluid through said electrode and through the spark gap, and means for effecting combined relative axial and rotary movement between the workpiece and said electrode to simultaneously make and tap a hole in the workpiece with said electrode disposed in spaced relation with the workpiece.

4. An apparatus for producing a screw thread or the like in a workpiece by electrically dislodging particles of the material of the workpiece, which comprises means for supporting said workpiece, an externally threaded electrode located above said workpiece and spaced from said workpiece by a gap, energy storage means including a condenser, a circuit connecting said condenser for repetitive charging from a source of electric power, an electric circuit connecting said condenser to the workpiece and said threaded electrode for the application of a series of time-spaced spark discharges across the gap between said electrode and the workpiece, an internally threaded guide nut fixed relative to said workpiece and adapted to receive said threaded electrode in complementary relation therewith, and means for rotating said electrode in said nut to simultaneously advance it toward the workpiece to a point at which said condenser will discharge sparks across said gap and generate a threaded hole in the workpiece with continuous physical separation between said electrode and said workpiece.

5. The method of producing a screw thread or the like in a workpiece by means of electrical dislodgement of particles of the material of the workpiece, which comprises connecting an electrode having a thread-like contour thereon to one terminal of an energy storing and discharging circuit which includes a condenser, connecting said working to an opposite terminal of said energy storing and discharging circuit, repetitively charging said condenser from a source of electric energy, effecting relative movement of said workpiece and said electrode axially of said electrode to reduce the gap therebetween to cause said condenser circuit to discharge sparks through a dielectric medium in said gap between said electrode and said workpiece, and simultaneously making and tapping a hole in said workpiece by effecting relative translation and rotation between said workpiece and said electrode while maintaining physical separation therebetween.

6. The method of producing a screw thread or the like in a workpiece by means of electrical dislodgement of particles of the material of the workpiece, which comprises electrically connecting a hollow electrode having an approximately complementary thread thereon to the negative terminal of a condenser, electrically connecting said workpiece to the positive terminal of said condenser, immersing the adjacent portions of said electrode and said workpiece in a dielectric liquid, electrically connecting said condenser in circuit with a source of current, bringing said electrode and said workpiece into closely spaced relation to initiate a series of time-spaced spark discharges through the dielectric liquid between said electrode and said workpiece, simultaneously making and threading an aperture in said workpiece by effecting relative axial rotation between said workpiece and said electrode while maintaining a gap therebetween, and circulating dielectric liquid through said hollow electrode and delivering it at the gap between said electrode and said workpiece.

7. A method of producing threaded contours by electrical dislodgement of particles from a conductive workpiece and which comprises providing means for holding the workpiece, providing a tool having a thread-like contour, interposing a dielectric medium between the tool and the workpiece, passing a series of time-spaced electrical spark discharges between the tool and the workpiece through the dielectric medium, simultaneously making and tapping a hole in the workpiece by effecting combined relative revolution and translation between the tool and the workpiece, and controlling the surface finish and precision of the tapped hole by regulating the energy release per spark discharge.

8. The method set forth in claim 7 and wherein maximum speed of cutting for a given operating condition is achieved by running at the maximum frequency of spark discharge obtainable under said operating condition.

9. The method of machining helical contours and the like in a workpiece by electrical dislodgement of material particles therefrom, and which comprises providing a hollow tool having an external helical surface and an axial bore open at both ends of the tool, bringing the tool into proximity with the workpiece to define a spark gap therebetween, circulating a dielectric medium through the bore of the tool and the spark gap, effecting a series of time-spaced electrical spark discharges across the spark gap and through the dielectric medium, and effecting combined relative revolution and translation between the tool and the workpiece so as to generate simultaneously a hole with a contour substantially complementary to the external helical surface of the tool, and a core of undislodged workpiece material within the hole substantially complementary to the axial bore of the tool.

10. In an apparatus for generating threaded contours by electrical dislodgement of particles from a conductive workpiece, the combination comprising means for holding the workpiece, a hollow tool having a thread-like contour thereon and a longitudinal bore therein, means for effecting a series of time-spaced electrical spark discharges between said tool and the workpiece through an interposed dielectric medium, means for circulating the dielectric medium through said hollow tool, and means for effecting combined relative revolution and translation between said tool and the workpiece to simultaneously make and tap an annular hole in the latter.

11. The combination defined in claim 10, and wherein the hollow tool has a thread-like contour on both its interior and its exterior.

12. The combination defined in claim 1, and wherein said tool is made of non-ferrous material.

13. The combination defined in claim 1, and wherein said tool has an external surface tapered axially toward its work-engaging end.

14. A machine for generating thread-like contours in an anodic workpiece of conductive material by dislodgement of particles therefrom through application thereto of a series of time-spaced electrical spark discharges across a dielectric-filled spark gap, said machine comprising, in combination, a base, an upstanding column fixed to said base, a workpiece support having means for securing the anodic workpiece thereto, a dielectric fluid container housing said workpiece support and mounted on said base, electrical energy storage means, a charging circuit connecting said energy storage means with a source of electrical energy, a first arm adjustably secured to said column and extending generally radially therefrom, a head fixed to the outer end of said first arm, a second arm adjustably secured between said base and said first arm and extending generally radially of said column, a guide nut fixed to the outer end of said second arm, a tool holding device slidably and rotatably mounted in said head for controlled rotational and translational movement with respect thereto, means for electrically insulating the workpiece from said tool holding device, an electric spark discharging circuit connected with said energy storage means and with said tool holding device and adapted for connection with said workpiece, and means for simultaneously shaping and threading a portion of the workpiece, said shaping and threading means being securely mounted in said tool holding device and disposed in closely fitted engagement with said guide nut, said guide nut acting upon said shaping and threading means to control translational movement thereof when said means is controllably rotated by said tool holding device.

15. A machine for making a threaded hole in an anodic workpiece of conductive material through application thereto of a series of time-spaced electrical spark discharges, said machine comprising, in combination, a base, an upstanding column fixed to said base, a workpiece support having means for securing the anodic workpiece thereto, a dielectric fluid container housing said workpiece support and mounted on said base, a condenser, a charging circuit connecting said condenser with a source of current, a first arm adjustably secured to said column and extending generally radially therefrom, a hollow head fixed to the outer end of said first arm, a second arm adjustably secured to said column between said base and said first arm, said second arm extending generally radially from said column and into said container, a guide nut fixed to the outer end of said second arm, a tool holding device slidably and rotatably mounted in said head for controlled rotational and translational movement with respect thereto, said tool holding device having an axial passage therein communicating freely with the interior of said hollow head, means for electrically insulating said tool holding device from said workpiece support, an electric spark discharging circuit connected with said condenser and with said tool holding device and said workpiece support, means for simultaneously shaping and threading a portion of the workpiece while maintaining a spark gap with respect to the latter, said means being securely mounted in said tool holding device and disposed in closely fitted engagement with said guide nut, said guide nut acting upon said shaping and threading means to control translational movement thereof when said means is controllably rotated by said tool holding device, said shaping and threading means also having open communication between the axial passage of said tool holding device and said spark gap, a fluid conduit connected with said hollow head, a fluid conduit connected with said container, and a pump connected with both said conduits, said pump being adapted to circulate dielectric fluid through the spark gap.

16. The combination defined in claim 14, and wherein said shaping and threading means comprises an electrode tool having a threaded longitudinal bore therein.

17. The combination defined in claim 14, and wherein said shaping and threading means comprises an electrode tool having a threaded longitudinal bore therein and external threads thereon corresponding in pitch to those of the bore.

18. An apparatus for producing a screw thread or the like on a workpiece of conductive material by electrical dislodgement of particles of such material therefrom, said apparatus comprising the combination of means for supporting the workpiece, a hollow electrode spaced from said workpiece by a spark gap inundated with a dielectric fluid, said electrode having an internal contour of thread-like form, electrical energy storage means, charging and discharging circuits for said storage means, said discharging circuit being connected to said electrode and to the workpiece for the application of a series of time-spaced spark discharges across the spark gap, means for circulating dielectric fluid through said electrode and for delivering such fluid at the spark gap, and means for effecting combined relative axial and rotary movement between the workpiece and said electrode to simultaneously shape and thread a portion of the workpiece, such movement telescoping said electrode over such portion of the workpiece.

19. A method of producing threaded contours by electrical dislodgement of particles from a conductive workpiece and which comprises providing means for holding the workpiece, providing a hollow electrode tool having a thread-like internal contour, interposing a dielectric medium between the tool and the workpiece, passing a series of time-spaced electrical spark discharges between the tool and the workpiece through the dielectric medium, and simultaneously shaping and threading a portion of the workpiece by telescoping said electrode over such portion through the application of combined relative revolution and translation between said hollow electrode tool and the workpiece.

EDMUND E. TEUBNER.

References Cited in the file of this patent

UNITED STATES PATENTS

| Number | Name | Date |
| --- | --- | --- |
| 1,195,145 | Mattingly | Aug. 15, 1916 |
| 2,335,741 | Contaldi | Nov. 30, 1943 |
| 2,404,053 | Glover, Jr. | July 16, 1946 |
| 2,441,319 | Harding | May 11, 1948 |
| 2,501,954 | McKechnie et al. | Mar. 28, 1950 |
| 2,526,423 | Rudorff | Oct. 17, 1950 |

FOREIGN PATENTS

| Number | Country | Date |
| --- | --- | --- |
| 257,468 | Switzerland | Apr. 1, 1949 |